United States Patent

Arai

[11] Patent Number: 5,987,716
[45] Date of Patent: Nov. 23, 1999

[54] TONGUE ASSEMBLY FOR AUTOMOBILE SEAT BELT

[75] Inventor: Takeshi Arai, Tokyo-To, Japan

[73] Assignee: Fuji Jukogyo Kabushiki Kaisha, Tokyo, Japan

[21] Appl. No.: 09/170,094

[22] Filed: Oct. 13, 1998

[30] Foreign Application Priority Data

Oct. 16, 1997 [JP] Japan ................................ 9-299554

[51] Int. Cl.⁶ .................................................. A44B 11/00
[52] U.S. Cl. .............................................. 24/633; 24/631
[58] Field of Search ........................... 24/633, 631, 602, 24/603

[56] References Cited

U.S. PATENT DOCUMENTS

| | | | |
|---|---|---|---|
| 4,704,771 | 11/1987 | Orje | 24/633 |
| 4,961,251 | 10/1990 | Smith | 24/633 |
| 5,052,087 | 10/1991 | Portuese | 24/633 |
| 5,548,878 | 8/1996 | Romagnoli | 24/633 |
| 5,617,617 | 4/1997 | Gustin | 24/633 |

FOREIGN PATENT DOCUMENTS 07251383A 10/1995 Japan .
08229849A 9/1996 Japan .

*Primary Examiner*—Victor N. Sakran
*Attorney, Agent, or Firm*—Smith, Gambrell & Russell

[57] ABSTRACT

A tongue assembly (2) for a seat belt (1) has a plate (20) provided with a sharp-pointed projection (23) on one side thereof, and a tongue portion (22); and a cover (3) of a synthetic resin covering the plate (20). The cover (3) has a front part (31), a back part (32), a projection covering part (34), and a base end part (33) fastened to the plate (20) along the other side opposite the side on which the sharp-pointed projection (23) is formed. The front part (31) and the back part (32) are connected to the base end part (33) by thinned hinge portions (35). In an emergency, the projection covering part (34) of the cover (3) is opened, the front part (31) and the back part (32) of the cover (3) are turned on the hinge portions (35) and are folded back so that the sharp-pointed projection (23) is exposed, and the front part (31) and the back part (32) extend behind the side of the plate (20) opposite the side provided with the sharp-pointed projection (23) and overlap each other to form a grip (5). The passenger grips the grip (5) and strikes a window glass with the sharp-pointed projection (23) to break the glass for emergency escape.

9 Claims, 2 Drawing Sheets

TONGUE ASSEMBLY FOR AUTOMOBILE SEAT BELT

BACKGROUND OF THE INVENTION

1. Field of the Invention

The present invention relates to a buckle assembly of a seat belt on a vehicle and particularly to a tongue assembly to be inserted in a latch (receptacle) fixedly connected to the vehicle.

2. Description of the Related Art

Emergency hammers are sold on the market to provide for emergencies in which the passenger of a vehicle must break the window glass or the windshield of the vehicle to escape therefrom. However, it is very difficult to use such an emergency hammer when the vehicle falls accidentally into the water.

An emergency hammer disclosed in JP-7-251383A has a hammer head attached to a grip and having a sharp-pointed end. By the emergency hammer, the passenger can easily break the window glass with the sharp-pointed end of the hammer head to escape through the window.

JP-8-229849A discloses a tape-fastened emergency hammer in a container attached to a carpet near a position where the driver's foot rests.

In the above mentioned prior art, problems arise in finding the emergency tool. An emergency in which the passenger of a vehicle must break a window glass to escape from the vehicle occurs very rarely to the passenger. Therefore, in an emergency occasion, the passenger in a panic takes an excessively long time to find the emergency tool because he may forget the place where the emergency tool is kept. Thus, there is a large possibility of death of the passenger in the car.

SUMMARY OF THE INVENTION

The inventor of the present invention noticed that a passenger of a vehicle must unfasten a seat belt before escaping from the vehicle when the vehicle encounters an accident, and he found the solution of keeping an emergency hammer for breaking a window glass or the windshield of the vehicle.

According to the present invention, a tongue assembly for a seat belt of a vehicle has a plate provided with a sharp-pointed projection with which a window glass of the vehicle can be broken.

When a passenger of the vehicle needs to escape from the vehicle, the tongue assembly is released from a latch and the sharp-pointed projection of the plate of the tongue assembly is used for breaking the window glass. Therefore, as any special tool for breaking the window glass need not be kept in the vehicle, there is no possibility that the passenger takes an excessively long time to find the tongue assembly or is unable to find the tongue assembly even if the passenger is in panic, and the ratio of success in escaping from the vehicle in emergencies can be increased.

The sharp-pointed projection of the plate of the tongue assembly may be covered with a cover capable of serving as a grip when removed from the sharp-pointed projection of the plate of the tongue assembly. The tongue assembly can be easily held by gripping the cover and the window glass can be easily struck with the sharp-pointed projection. The cover may be made of a synthetic resin. The cover for the sharp-pointed projection prevents the projection from damaging door trimmings and so on. The cover prevents the tongue assembly from being heated to high temperatures in summer.

A preferred embodiment of the present invention will become understood from the following detailed description by referring to the accompanying drawings.

DESCRIPTION OF THE PREFERRED EMBODIMENT

Figure 1A:
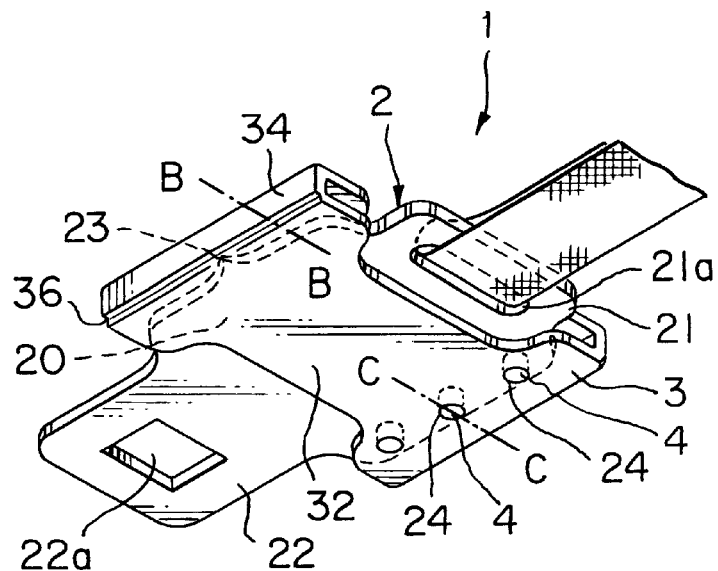
FIG. 1A is a perspective view of a tongue assembly for a seat belt.
Figure 1B:
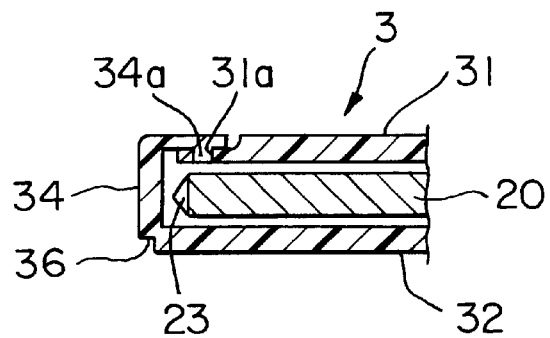
FIG. 1B is a sectional view taken on line B—B in FIG. 1A.
Figure 1C:
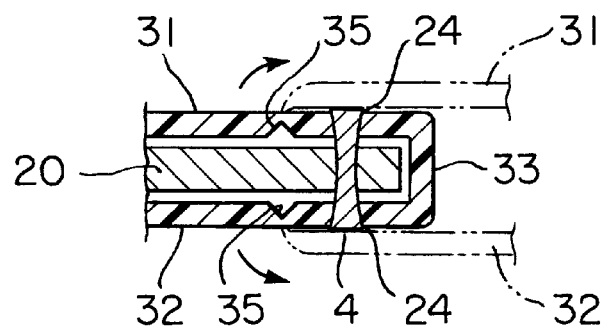
FIG. 1C is a sectional view taken on line C—C in FIG. 1A.

Referring to FIGS. 1A, 1B and 1C, a tongue assembly 2 in an embodiment according to the present invention is put on a seat belt 1. The tongue assembly 2 is engageable with a latch, not shown, fixedly connected to the body of a vehicle to fasten a passenger to a seat. A known release button included in the latch is pressed to disengage the tongue assembly 2 from the latch so that the passenger is released from the seat belt 1. The arrangement and function of the seat belt 1 are the same as those generally known and hence the description thereof will be omitted.

The tongue assembly 2 has a plate 20 having a base portion 21 provided with a slot 21a through which the seat belt 1 is passed, and an integral tongue portion 22 provided with an opening 22a. When the tongue portion 22 is inserted in the latch, a locking member, not shown, included in the latch drops in the opening 22a to lock the tongue assembly 2 in place in the latch. The tongue assembly 2 is similar in shape to a generally known tongue assembly, except that the plate 20 of the tongue assembly 2 has a sharp-pointed projection 23 formed integrally with the plate 20 on one side thereof, and the plate 20 is provided along the other side thereof with a plurality of holes 24 for attaching a cover 3 to the plate 20.

The cover 3 is made of a synthetic resin and covers the plate 20 and the sharp-pointed projection 23 of the plate 20 excluding the tongue portion 22 and the base portion 21 in which the slot 24 is formed. The cover 3 has a front part 31 covering the front surface of the plate 20, a back part 32 covering the back surface of the plate 20, a base end part 33 having a substantially U-shaped cross section, and a projection covering part 34 covering the side of the plate 20 provided with the sharp-pointed projection 23. The front part 31 and the back part 32 are connected to the base end part 33 by thinned hinge portions 35. The projection covering part 34 is connected to the back part 32 by a thinned hinge portion 36. The front part 31, the back part 32, the base part 33, the projection covering part 34, and the hinge portions 35 and 36 are formed in an integral structure by molding a synthetic resin. Fastening members 4, such as rivets or the like, are inserted through the base end part 33 of the cover 3, and the holes 24 formed in the plate 20 of the tongue assembly 2 to fasten the cover 3 to the plate 20. Projections 34a of the projection covering part 34 of the cover 3 are engaged with holes in a catch 31a formed in the front part 31 of the cover 3 to sandwich the plate 20 between the front part 31 and the back part 32 and to cover the side provided with sharp-pointed projection 23 with the projection covering part 34. In the normal state, the tongue portion 22 is inserted in and engaged with the latch to fasten the seat belt 1 and the tongue portion 22 is disengaged from the latch to unfasten the seat belt 1.

Since the plate 20 of the tongue assembly 2 is covered with the cover 3 of a synthetic resin, there is no possibility that the plate 20 of the tongue assembly 2 strikes directly at trimmings, such as door trimmings and pillar trimmings, and the sharp-pointed projection 23 damages the trimmings when engaging the tongue portion 22 of the plate 20 with and disengaging the same from the latch. The metal plate 20 having the tongue portion 22 is heated by the rays of the sun at high temperatures in the range of 60° C. to 70° C. and becomes too hot to touch with the hand. Since the plate 20 of the tongue assembly 2 is covered with the cover 3 of the synthetic resin, the plate 20 is not heated to a very high temperature and operations for fastening and unfastening the seat belt 1 can be facilitated.

Figure 2:
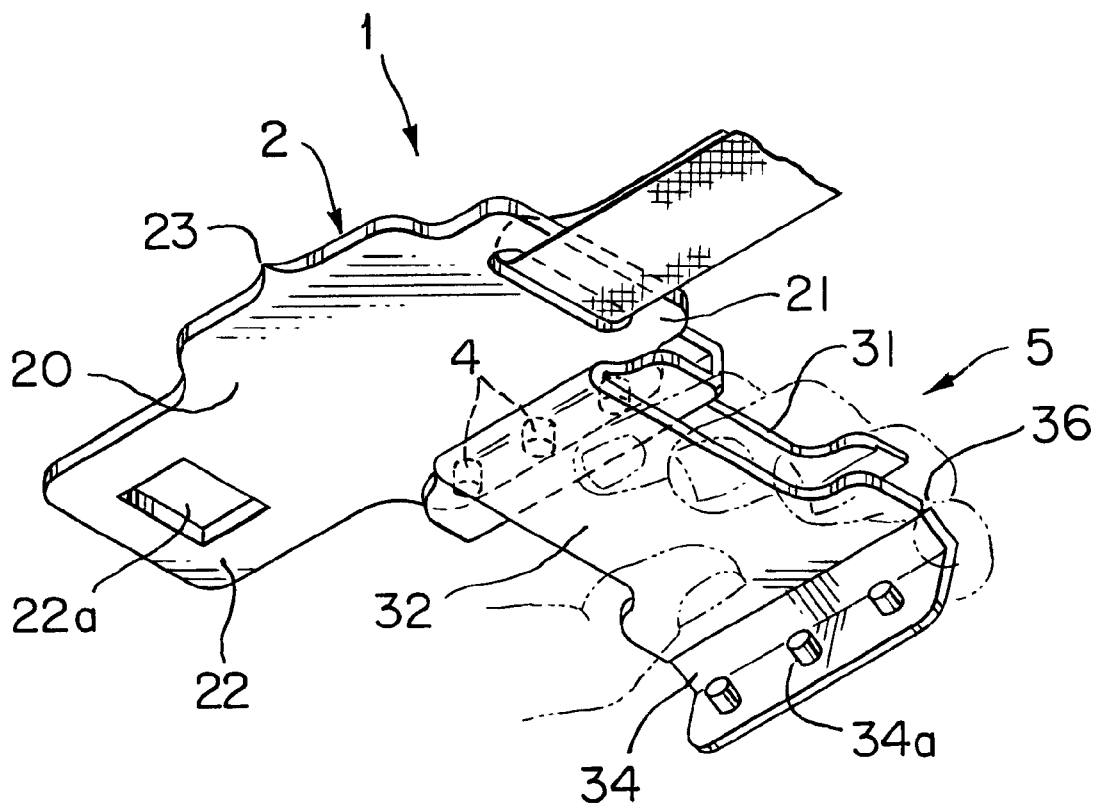
FIG. 2 is a perspective view of the tongue assembly of FIG. 1A in a state where a cover is removed.

In an emergency, the seat belt 1 is unfastened by pressing the release button of the latch to disengage the tongue assembly 2 from the latch. Then, the projection 34a of the projection covering part 34 of the cover 3 is disengaged from the catch 31a, the front part 31 and the back part 32 of the cover 3 are turned on the hinge portions 35 and are folded back so that the sharp-pointed projection 23 is exposed as shown in FIG. 2. The front part 31 and the back part 32 of the cover 3 extend behind the side of the plate 20 opposite the side provided with the sharp-pointed projection 23 and overlap each other to form a grip 5. The passenger grips the grip 5 and strikes, for example, the front windshield of the vehicle with the sharp-pointed projection 23 to break the front windshield.

Since the tongue assembly 2 put on the seat belt 1 can be used as a hammer to break the window glass, there is no possibility that the passenger takes an excessively long time to find the tongue assembly or becomes too confused to find the tongue assembly. The cover 3 serving as the grip facilitates breaking the window glass with the sharp-pointed projection 23. Thus, the passenger is able to escape surely and quickly from the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tongue assembly for a seat belt of a vehicle, comprising:

a plate having a tongue portion for engaging with a latch fixed to the vehicle;

a sharp-pointed projection provided on said plate, to break a window class of a vehicle; and a cover of a bendable material covering said plate to prevent damage to the interior of the vehicle in normal use, said cover being foldable to expose the sharp-pointed projection and to extend sideways from another side of the plate opposite the side with the sharp-pointed projection and to extend sideways from another side of the plate opposite the side with the sharp-pointed projection so as to serve as a grip to be gripped when using the sharp-pointed projection for breaking a window glass.

2. The tongue assembly according to claim 1, wherein:

said sharp-pointed projection is formed on one side of the plate and is normally covered with the cover.

3. The tongue assembly according to claim 1, wherein:

said cover has a base end part fastened to a part of the plate extending along said other side opposite the side with the sharp-pointed projection, a front part covering a front surface of the plate and connected to the base end part through a first hinge portion, a back part covering a back surface of the plate and connected to the base end part through a second hinge portion, and a projection covering part connected through a third hinge portion to one of free sides of the front and back parts and locked in place so as to cover said one side of the plate provided with the sharp-pointed projection, said projection covering part being openable to expose the sharp-pointed projection of the plate, with said front and back parts of the cover being folded back so as to extend outward from the other side of the plate to form a grip.

4. The tongue assembly according to claim 3, wherein:

said projection covering part is disengageably locked with said one of the free sides of the front and back parts.

5. The tongue assembly according to claim 1, wherein:

said bendable material is a synthetic resin.

6. A tongue assembly of a male side of buckle means connected to an end of a seat belt for inserting a plate thereof into a female side of said buckle means and for fastening a passenger on a seat in a compartment of a vehicle, comprising:

a base portion of said plate, connected to said seat belt through a slot provided therein;

a tongue portion formed on said plate at an opposite side of said base plate and provided with a latching opening for connection with said female side of said buckle by inserting thereinto;

a sharp edge portion formed on one of side edges of said plate between said base plate and said tongue portion, for use in breaking a glass window of said vehicle when evacuating therefrom in an emergency; and a cover covering said sharp edge portion so as to prevent the passenger from be ing injured thereby when said tongue assembly is normally used and to be safely usable for gripping thereof in ordinary buckling and unbuckling operations, said cover being openable to expose said sharp edge portion.

7. The tongue assembly according to claim 6, wherein:

said cover is hinged along another side edge of the plate.

8. The tongue assembly according to claim 6, wherein:

said cover is hingedly openable to expose said plate and the sharp edge portion and to extend sideways to serve as a grip when using the sharp-pointed projection for breaking a window.

9. The tongue assembly according to claim 6, wherein:

said cover is made of a bendable material.

\* \* \* \* \*